Oct. 9, 1934.　　　　S. F. LAWRENCE　　　1,976,235
TIRE CONSTRUCTION
Filed March 6, 1933　　　2 Sheets-Sheet 2

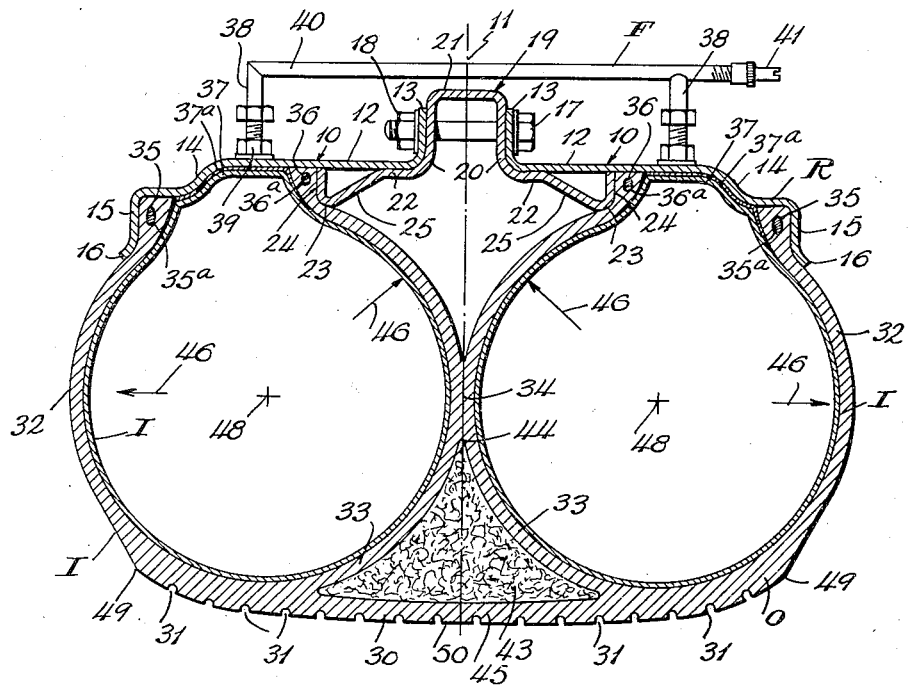

INVENTOR
STILLSON F. LAWRENCE
BY Oscar A. Geier
ATTORNEY

Patented Oct. 9, 1934

1,976,235

UNITED STATES PATENT OFFICE 1,976,235

TIRE CONSTRUCTION

Stillson F. Lawrence, New York, N. Y.

Application March 6, 1933, Serial No. 659,849

1 Claim. (Cl. 152—22)

This invention relates to tire constructions for automobiles and other vehicles and it particularly relates to a tire arrangement which will give low pressure riding qualities.

In designing tires for automobiles there has been a trend to larger tires relative to the size of wheels and to decrease pressure therein, with the result that the evolution has passed through balloon to a type of tires which are known as superballoon, doughnut tires or air-wheels.

Superballoon tires or air-wheels, however, are subjected to considerable stretching and bending during the operation of the automobile with the result that the walls of the tire must withstand relatively high internal stress.

In addition, such a tire undergoes considerable expansion in moving up from its point of contact with the ground to its top position, with the setting up of relatively large rupturing centrifugal forces.

The automobiles provided with such superballoon tires tend to steer very uneasily and with much difficulty. In addition, upon turning curves, the center of gravity of the car is so displaced that the actual contact with the ground is not at the proper angle to assure maximum stability. There also is a decrease of control by the driver with the tendency of the various undesirable vibrations, such as shimmying, to increase.

An object of the present invention is to provide a new tire and wheel construction for automotive and other road vehicles in which, although low pressure riding effect is obtained, nevertheless assurance is had of relatively high stability, relatively easy steering and a substantial decrease in the internal stress and in stretching and bending of the tire structure itself.

Another object of the invention is to provide a new and improved tire construction for automotive and other road vehicles, in which although the tires may be inflated to a relatively low degree, they will, nevertheless, not cling excessively to the road nor will they tend to cause the car to wobble or shimmy or to be subject to less control by the driver, particularly in turning curves.

Other objects will be obvious and will appear during the course of the following specification.

It has been found that the various objects above stated may be satisfactorily accomplished by designing the tire or wheel construction so so that the tire will assume a normal position which will be substantially intermediate that of the ordinary balloon or superballoon tire when above the wheel and when below the wheel.

By designing the tire of such a contour it has been found possible to achieve many advantages of normal or superballoon tires without incurring many of the disadvantages inherent in these forms.

It has been found most satisfactory to make the tire of approximately elliptical or ovular shape and it has been found most satisfactory to retain such shape by a plurality of inner tire elements which are enclosed in a substantially unitary outer tire element which is so arranged that the pressures in the inner tire element or elements making up a single complete structure will all be maintained substantially constant.

In practice, it has been found most satisfactory to utilize two inner tire or tube elements symmetrically positioned inside of the outer tire element which is so constructed as to embrace two of said elements and to be suitably contained in a rim. These outer tire or tube elements are preferably separated by a central separating wall attached to the outer tire element.

In a preferred construction the inner tire elements are suitably connected so that the same pressures will be maintained therein.

The above and other objects of this invention will appear more clearly from the following detailed description when taken in connection with the accompanying drawings showing a preferred embodiment of the inventive idea.

In the drawings:

Fig. 1 is a side sectional view of one form of tire construction according to the present invention.

Fig. 2 is a side sectional view of another form.

Figure 3:
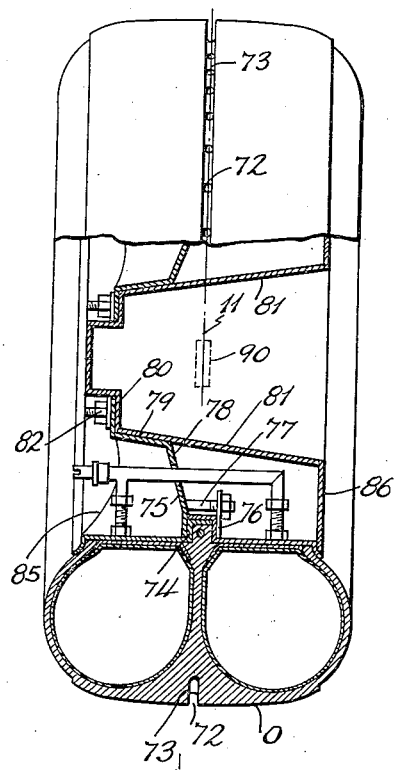
Figs. 3 and 4 are side and front views upon a reduced scale of a complete wheel, Fig. 3 being in fragmentary section illustrating still another form.

In Fig. 1 the rim R supports the outer tire element O and cooperates with said outer tire element O to enclose the inner tire elements I. Both these tire elements are provided with the fluid connections F. As shown, the rim elements are made in halves 10 which are symmetrically disposed in respect to the center line 11, each rim half being provided with a flattened horizontal portion 12, the inner ends of which are flanged vertically at 13 toward the center of the wheel (not shown), the upper portions of which are curved outwardly as indicated at 14 and provided with the vertical outside flanges 15 which have lips 16 grasping the outer surface of the outer element O.

These two inner elements 10 are bolted by the bolt 17 and the nut 18 to the central holding element 19, which is split for assemblage, the bolt 17 passing through openings (not shown) in the vertical flanges 13 and the element 19. The element 19 is provided with a channel which receives the bolt 17, said channel having vertical sides 20 and a peripheral base 21 with horizontal portions 22. The sides 20 and the horizontal portions 22 closely fit the vertical flanges 13 and the horizontal portions 12 of the rim element 10. The outer ends of the inner rim element 19 is provided with the knob 23 which contacts closely and holds the tire, the outer sides of which are vertical as indicated at 24 and the adjacent portions 25 slope outwardly toward the outer side of the tire.

The carcass or outer tire element O is preferably constructed of a tread 30 provided with suitable indentations 31 and to this tread are connected the side elements 32 and 33, the interior side elements 33 being formed into unitary structure at end portions 34. These tread elements 30 and side elements 32 and 33 may be suitably formed of fabric coated with or formed of rubber, with an additional layer of rubber to form the coating 30 attached to the outer face thereof.

Each of the elements 32 and 33 terminate in enlarged rim portions 35 and 36, respectively, which rim portions cooperate with the rim element R. These enlarged rim portions 35 and 36 respectively contain the hoop elements 35ª and 36ª.

The outer rim portions 35 of the tire fit inside of the vertical flange 15 and contact with the lip 16 while the inner rim portions 36 fit into the corner formed between the flat 12 of the rim halves 10 and the vertical portion 24 of the center rim element 19.

The inner tube or tire elements I may be of usual annular shape and should be positioned inside of the openings left in the outer tire element O and at their inner sides 37 preferably are protected by the liner 37a which contacts with the bottom 12 and the sloping portion 14 of the rim halves 10.

Each of the inner tube or tire elements I is provided with a fluid inlet stem 38 which is connected to the flat portions 12 of the rim halves 10 by the nuts 39. The stems 38 are connected together by the main or conduit 40 which has an inlet cap 41 by means of which both tire elements I may be filled simultaneously. It will be noted that the stems 38 in the main 40 also connect the inner tube elements I throughout operation of the vehicle, with the result that the pressures therein will be equalized. The triangular space 43 between the outer tire elements 33 may be filled with sponge rubber or be otherwise constructed and arranged so as to eliminate the centrifugal load on the tread when it is off the road. If desired, straps could be extended from the apex 44 of this triangular section 43 to the center of the tread at 45 to assist or to replace the sponge rubber.

In operation the inner tube elements I are preferably inflated at about five to ten pounds per square inch and this pressure will be maintained the same in both inner tire elements I throughout operation of the vehicle. Although the inner tire elements I will undergo a certain amount of deflection, particularly at the places indicated by the arrows 46, this deflection will be much less in magnitude and effect than the deflections of the superballoon or doughnut tires previously described. At the same time, nevertheless, all the desirable riding qualities of these superballoon tires will be obtained. In addition, the construction will assure relatively high stability, comparatively easy steering and will surprisingly result in decrease of wobbling or shimmying of the entire vehicle. A particular advantage inherent in this type of tire is that the distance from the automobile body to the ground will not vary excessively at different loads.

In one specific construction which has been found satisfactory, and to which the invention is by no means restricted, the distance between center points 48 and 48 was made between 6¼" and 6½", as compared to a tread width between the points 49 of about 10½". In this construction the external diameter of the inner tube elements I was made 6" while the height from the top of the tread 50 to the outer face of the flat portion 12 of the rim section 10 was about 7¼". The diameter of the wheel between the crowns of the tread 50 was about 28", leaving the rim diameter of about 13½".

In Fig. 2 is shown a slightly different embodiment in which corresponding functioning parts are designated by the same numerals prime. In this embodiment the central wall 70 is molded or pre-shaped so as to deflect in a certain direction, as indicated by the arrow 68.

In Fig. 2 a central open space 60 is left in the triangular section 61 to decrease the weight at this part of the tire and to permit flow of the rubber thereinto when stressed adjacent the tread. The rim halves 10' in this embodiment are provided with two inturned horizontal flanges 62 and 63 which fit closely together as indicated. The hoops 64 are similarly positioned with respect to the hoops 35a of Fig. 1 while the hoops 65 are positioned in the channel 66 formed outside of the junction of the rim flanges 62 and 63. In this embodiment the deflection is indicated by the dotted lines 67 and by the arrow 68. In this embodiment the walls 33' of the tire may be molded together at 70. In the tire construction as shown in Fig. 2, if the load be considered 600 pounds per wheel with a thirty percent impact, 8 pounds pressure may be conveniently utilized.

In forming the carcass of the outer tire element O right and left halves may be wound around cores in the usual manner and then brought together. The pieces included in the triangular section may then be added and then the tread 30' may be finally attached.

Figure 4:
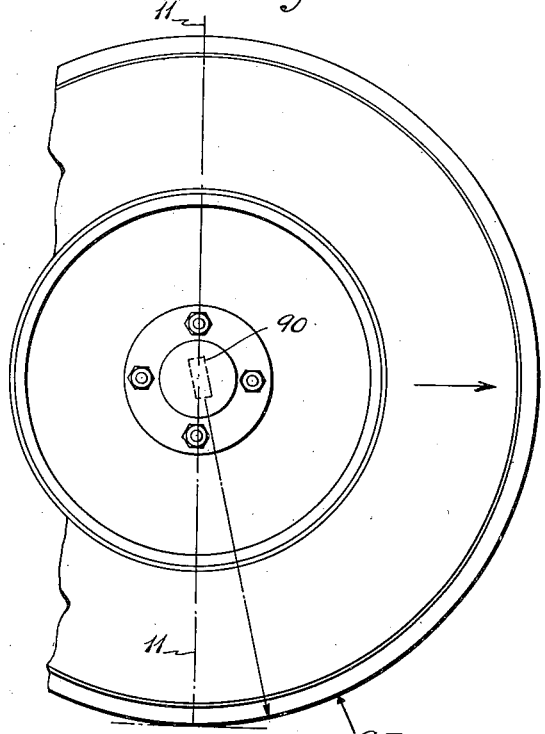

In Figs. 3 and 4 the tire of the present invention as a whole is shown. In this construction the tire O is centrally provided with a continuous peripheral groove 72 in which at intervals are located the cup shaped cavities 73. The groove 72 prevents popping or other undesirable noises because of the vacuum cups 73. The channel section 74 of the rim is clamped between the plates 75 and 76 by the bolt 77, the plate 75 being contained in the plates 78 and 79 and the flange 80 which contact with the hub 81 to which they are bolted at 82. The elements 78 and 79 and 80 are preferably integral and are made of a single stamping and carry the main weight of the wheel. The enclosures 85 and 86 are preferably utilized to encase the construction and may be chromium plated if desired. As shown, the rear casing element 86 may also be made of extra thickness to assist in carrying the load.

The pivot king pin or spindle axis 90 is diagrammatically illustrated as lying in the vertical plane of the wheel and as being inclined forwardly, see Fig. 4 particularly, thereby directed toward a point between the vertical center line and the point of contact 95. The point of contact 95 is where the tire hits the ground, and when it meets obstacles will commence to compress under the weight of the automobile or vehicle. By locating the pin in position in this manner it has been found that a most satisfactory balance is obtained, with a very remarkable amount of decrease in shimmying or wobbling of the vehicle. Instead of the disc or wire construction, as shown in Fig. 4, wire or artillery types of wheels might be readily employed.

Figure 5:
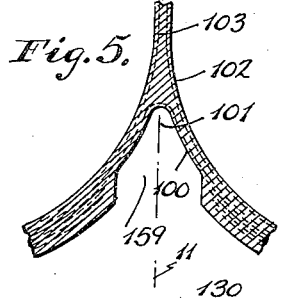
Figs. 5, 6, 7 and 8 are fragmentary sectional views of several modifications showing in detail certain features of the carcass construction.

In Fig. 5 is shown a slightly different arrangement of the tire in which certain of the fabric plies 100 are carried across the junction 101 while the rest of the inner plies 102 are carried up in the common inner wall 103. This structure is found very useful for certain purposes.

It is obvious that if desired the number of plies and their arrangements may be considerably varied, with certain of the plies extending directly between the outer hoops while other of the plies extend from an outer hoop between the outer and inner hoops of the single and double elements. Also, if desired, a plurality of hoops may be positioned at different places in the base of the tire to assure a maximum support therefor.

Figure 6:
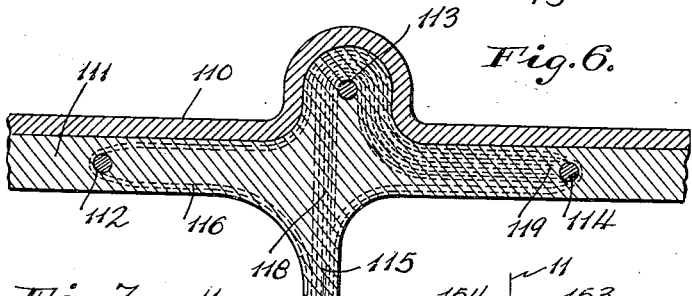
Figure 7:
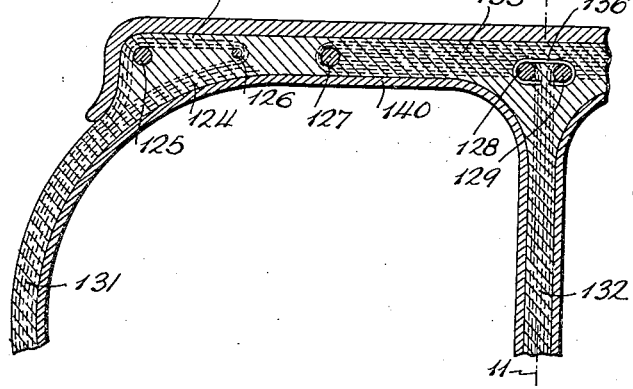

Figs. 6 and 7 show slightly different tire constructions, particularly in regard to the winding of the fabric plies and the location of the hoops.

In Fig. 6 the rim 110 closely contacts with the inner tire section 111 which is provided with the hoops 112, 113 and 114. The central wall 115 separates the two inner tube elements. It will be noted according to this construction that two of the plies 116 are turned over the hoop 112 while most of the remaining plies 118 turn over the hoop 113 and terminate adjacent to the hoop 114 as indicated at 119. This assures a much more satisfactory construction.

In Fig. 7 are shown a plurality of hoops embedded in a tire and combined with various plies of fabric. The drawings do not show the actual number of plies but merely the relative number in each part of the casing. This relation is indicated by showing three plies, five plies and six plies and nine plies at various parts of the tire construction in this embodiment. The hoops 125, 126, 127, 128 and 129 are shown embedded in the tire, with three plies of the fabric passing over the hoops 125 and 126, as indicated at 130, while five plies of the fabric make up the outer wall of the tire as indicated at 131. Six plies of fabric make up the central wall 132 while three plies making up the wall 124 extend around each side wall toward the tread. Nine plies extend between the hoop 127 as indicated at 135 and the symmetrically located hoop on the other side of the double tire. If desired, a metal clip 136 may be employed to hold the hoops 128 and 129 together. In this construction shown in Fig. 7 it is possible to so support the inner tube 140, whereby it is possible to save a liner. The central wall 132 is preferably molded so that it will only deflect in one direction as indicated in Fig. 2.

Figure 8:
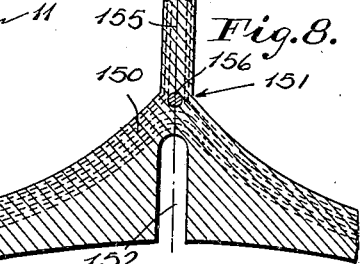

In Fig. 8 is shown a construction similar to Fig. 5 in which the carcass is provided with a plurality of anti-rip fabrics 150 which extend across the junction 151. The center of the tread of the tire is provided with the cup or groove 152 permitting a cooling, and allowing for the flow of the rubber. The fabric plies 153 and 154 extend up through the common wall 155 and are wound around the tread hoop 156.

It will be noted that in all of the constructions shown that space is provided to permit of the flow of rubber under stress at a place fairly close to the position of stress. In Fig. 1 the rubber will flow as indicated by the arrows 46 into the triangular space adjacent the split rim element 19. The sponge rubber triangular section 43 will also permit of flow of the rubber adjacent the lower central portion of the tread.

In Fig. 2 the opening 60 permits of the flow of rubber when stressed by the weight of the car at the tread and the premolding or preforming of the central wall 70 assures that such central wall 70 will always move in one direction under stress. The groove 72 in Fig. 3, 152 in Fig. 8 and 159 in Fig. 5 also functions to permit of the displacement of the rubber material of the carcass or outer tire element O.

The fabric constructions shown in Figs. 2, 5, 6, 7 and 8 are merely illustrative and it is obvious that the arrangement of hoops and the position of the fabric may be varied in many ways without departing from the scope of the present invention.

It will be noted in Fig. 2 that the central wall 70 is so formed as to always move under stress in the direction indicated by the arrow 68 when the tire is subjected to road stresses or is collapsed due to the weight of the car resting thereon. In Fig. 1 it will also be noted that the deformation under loading of the car will also take place in predetermined directions indicated by the arrows 46. It will be further noted that the compression or air pressure within both tires will always be maintained the same by the connection 40 of Fig. 1 and the connection 40' of Fig. 2, and assurance is had that there will be no forces tending to prevent this constant stressing of the tire structure in one direction.

What is claimed is :

In a pneumatic tire, the combination with a wheel rim, of a pair of casings of approximately circular cross section mounted thereon side by side to form a central section of substantially X-shape in cross section, inner tube elements in each of said sections, an inlet air conduit connecting said inner tube elements to each other, whereby the air pressure in both inner tube elements will be maintained the same at all times, said casings being each provided with two enlarged circumferential bead portions connected to the rim, the adjacent bead portions of each casing being supported by the rim inside of the outer bead portions and closer to the axis of the tire than said outer bead portions, said rim being formed of three sections including a middle inverted U section with two lateral extensions, the ends of which extensions are radially flanged and press outwardly upon said adjacent bead portions and two angle members with inside radial flanges bolted to the sides of said U section and having each a stepped longitudinal flange, the inner steps carrying the adjacent bead portions and the outer steps carrying the outside bead portions.

STILLSON F. LAWRENCE.